(12) United States Patent
Diehl

(10) Patent No.: US 9,418,208 B2
(45) Date of Patent: Aug. 16, 2016

(54) DISTRIBUTION OF DIGITAL CONTENT PROTECTED BY WATERMARK-GENERATING PASSWORD

(75) Inventor: Eric Diehl, Cesson Sévigné (FR)

(73) Assignee: Thomson Licensing, Issy-les-Moulineaux (FR)

( * ) Notice: Subject to any disclaimer, the term of this patent is extended or adjusted under 35 U.S.C. 154(b) by 85 days.

(21) Appl. No.: 13/977,940

(22) PCT Filed: Dec. 16, 2011

(86) PCT No.: PCT/EP2011/073094
§ 371 (c)(1),
(2), (4) Date: Aug. 15, 2013

(87) PCT Pub. No.: WO2012/093026
PCT Pub. Date: Jul. 12, 2012

(65) Prior Publication Data
US 2013/0318356 A1    Nov. 28, 2013

(30) Foreign Application Priority Data

Jan. 3, 2011 (EP) .................................... 11305004
Mar. 1, 2011 (EP) .................................... 11156464

(51) Int. Cl.
*G06F 21/10* (2013.01)

(52) U.S. Cl.
CPC .......... *G06F 21/10* (2013.01); *G06F 2221/072* (2013.01)

(58) Field of Classification Search
CPC .. G06F 21/10; G06F 2221/072; H04L 9/3271
USPC .......................................... 713/176; 703/176
See application file for complete search history.

(56) References Cited

U.S. PATENT DOCUMENTS

| 5,586,186 A | 12/1996 | Yuval et al. |
| 6,002,772 A | 12/1999 | Saito |

(Continued)

FOREIGN PATENT DOCUMENTS

| CN | 101196975 | 6/2008 |
| EP | 0884669 | 12/1998 |

(Continued)

OTHER PUBLICATIONS

Jian Zhao__Applying Digital Watermarking Techniques to Online Multimedia Commerce, Proceedings of the International Conference on Imaging Science, Systems and Applications, XX, XX, Jun. 30, 1997.

(Continued)

*Primary Examiner* — Harunur Rashid
(74) *Attorney, Agent, or Firm* — Myers Wolin LLC

(57) ABSTRACT

A receiver receives digital content scrambled using a control word and a user code for the scrambled content. A user inputs the user code that is forwarded to a code extractor that generates the control word and a user identifier from it. The control word is sent to a descrambler, a watermark information generator and a visible watermark insertion unit. The descrambler descrambles the scrambled content using the control word, an invisible watermark insertion unit inserts invisible watermark information obtained from the watermark information generator into the descrambled content and the visible watermark insertion unit inserts the user identifier as a visible watermark. Also provided are a corresponding method for processing digital content and a method and a device for generating the user code.

8 Claims, 3 Drawing Sheets

(56) References Cited

U.S. PATENT DOCUMENTS

| | | | |
|---|---|---|---|
| 6,141,753 A * | 10/2000 | Zhao | G06T 1/0021 380/277 |
| 7,383,545 B1 | 6/2008 | Yoo | |
| 7,676,039 B2 | 3/2010 | Seok et al. | |
| 2004/0059938 A1* | 3/2004 | Hughes et al. | 713/200 |
| 2004/0068659 A1* | 4/2004 | Diehl | 713/182 |
| 2004/0120529 A1* | 6/2004 | Zhang et al. | 380/278 |
| 2004/0151314 A1* | 8/2004 | Candelore | 380/239 |
| 2004/0243803 A1 | 12/2004 | Codet et al. | |
| 2005/0278257 A1* | 12/2005 | Barr et al. | 705/57 |
| 2006/0156003 A1* | 7/2006 | Zhang et al. | 713/176 |
| 2008/0028234 A1* | 1/2008 | Ducharme | 713/189 |
| 2008/0130058 A1 | 6/2008 | Cheng | |
| 2010/0228971 A1* | 9/2010 | Carles et al. | 713/163 |
| 2010/0235624 A1* | 9/2010 | Candelore | H04N 7/163 713/155 |
| 2013/0205132 A1* | 8/2013 | Wajs et al. | 713/150 |
| 2013/0271653 A1* | 10/2013 | Kim et al. | 348/473 |
| 2013/0279696 A1* | 10/2013 | Hamon et al. | 380/255 |

FOREIGN PATENT DOCUMENTS

| | | |
|---|---|---|
| JP | 11007241 | 1/1999 |
| KR | 100936124 | 1/2010 |
| WO | WO 9941900 | 8/1999 |

OTHER PUBLICATIONS

Wikipedia Product Key URL:http://en.wikipedia.org/w/index.php?title=Product_key&oldid=400641139 [retreved on Aug. 23, 2011].

Wikipedia; Digital watermarking, URL:http://wikipedia.org/w/index.php?title=Digital watermarking&oldid=403434575 [retrieved on Aug. 23, 2011].

Wikipedia; Base64, wikipedia.org URL:http://en.wikipedia.org/w/index.php?title=Base64&oldid=401070954 [retrieved on Aug. 23, 2011].

URL:http://www.licenturion.com/Manual-LicKey .pdf, "Using Product Keys and Personal Product Keys in your application".Mar. 26, 2004, pp. 1-57, [retrieved on Feb. 8, 2012].

International Search Report for PCT/EP2011/073094 dated Feb. 21, 2012.

* cited by examiner

DISTRIBUTION OF DIGITAL CONTENT PROTECTED BY WATERMARK-GENERATING PASSWORD This application claims the benefit, under 35 U.S.C. §365 of International Application PCT/EP2011/073094, filed Dec. 16, 2011, which was published in accordance with PCT Article 21(2) on Jul. 12, 2012 in English and which claims the benefit of European Patent Applications No. 11156464.7, filed on Mar. 1, 2011 and No. 11305004.1, filed on Jan. 3, 2011.

TECHNICAL FIELD

The present invention relates generally to digital content distribution, and more particularly to a solution for protected distribution of content to which access is provided via a password.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

There are two main families of solutions for controlling access to digital content such as films, music and computer files: access control and encryption.

In access control, a user requests access to a content from a server and then, if access is granted, receives the content from the server.

A typical prior art example of encryption is illustrated in FIG. 1. Clear (i.e. non-encrypted) content 110 is provided to a scrambler 120 that also takes one or more so-called control words (CWs, also called keys) 140 as input to an encryption algorithm in order to output scrambled (i.e. encrypted) content 130. A receiver takes the encrypted content and the control word(s) (or equivalents thereto) as input to a corresponding decryption algorithm so as to restore the clear content. In symmetric encryption (e.g. AES), the control word(s) used for encryption and decryption are the same; in asymmetric encryption (e.g. RSA), they are different but linked to one another.

Encrypted content may be distributed freely, but a user who does not possess a secret necessary for decryption cannot normally decrypt and access the content. Such a secret may for example take the form of:

A password input by a user, where the password triggers decryption, either by having the password act as an authorization signal to a decryption device that stores the secret or by using the secret (or information derived from it) as a decryption key.

A valid license delivered to the user, wherein the license usually comprises the decryption key. This solution can be transparent to the user.

A physical token that provides the decryption key.

Continuing the encryption example of FIG. 1, the secret that is necessary for decryption is the control word(s) that may be delivered as described.

US 2006/0156003 describes a system in which encrypted content and a corresponding license are delivered to a receiver that decrypts the content and inserts a watermark that may comprise information specific to the receiver and content-related information from the license. While this solution works well, it is in some cases 'heavy' as it requires the ability to handle licenses.

Encryption using passwords overcomes the necessity to handle licenses, but a problem with it is that once the user has obtained the password, the password may be spread to other users without authorization. This problem does not exist, or is at least much less pronounced, in the cases where decryption is controlled using a license or a physical token.

It can thus be appreciated that there is a need for a solution that makes the decryption using a password more secure. The present invention provides such a solution.

SUMMARY OF INVENTION

In a first aspect, the invention is directed to a method of processing digital content. A device comprising a processor receives a content scrambled using a control word; receives, via a user interface, a user identifier and a user code; processes the user identifier and the user code to obtain the control word; descrambles the scrambled content using the control word; inserts into the descrambled content a watermark based on the user identifier; and outputs the watermarked content.

In a second aspect, the invention is directed to a method of processing digital content. A device comprising a processor receives a content scrambled using a control word; receives, via a user interface, a text string; processes the text string to obtain an intermediate code; processes the intermediate code to obtain the control word and a user identifier; descrambles the scrambled content using the control word; inserts into the descrambled content a watermark based on the user identifier; and outputs the watermarked content.

In a first preferred embodiment, the intermediate code is obtained solely from the text string.

In a second preferred embodiment, the watermark is an invisible watermark.

In a third preferred embodiment, the apparatus further inserts the user identifier as a visible watermark.

In a third aspect, the invention is directed to a device for processing digital content. The device comprises a processor adapted to receive a content scrambled using a control word; receive, via a user interface, a user identifier and a user code; process the user identifier and the user code to obtain the control word; descramble the scrambled content using the control word; insert into the descrambled content a watermark based on the user identifier; and output the watermarked content.

In a fourth aspect, the invention is directed to a method of processing digital content. A device comprising a processor receives a content scrambled using a control word; receives, via a user interface, a text string; processes the text string to obtain an intermediate code; processes the intermediate code to obtain the control word and a user identifier; descrambles the scrambled content using the control word; inserts into the descrambled content a watermark based on the user identifier; and outputs the watermarked content.

In a fifth aspect, the invention is directed to a method of generating a user code for accessing digital content. A device comprising a processor receives a control word used to scramble the digital content; receives an identifier for a user; generates an intermediate code from at least the control word and the identifier for the user; generates a text string from the intermediate code; and outputs the text string.

In a sixth aspect, the invention is directed to device for generating a user code for accessing digital content. The device comprises a processor adapted to receive a control word used to scramble the digital content; receive an identifier for a user; generate an intermediate code from at least the control word and the identifier for the user; generate a text string from the intermediate code; and output the text string.

BRIEF DESCRIPTION OF DRAWINGS

Preferred features of the present invention will now be described, by way of non-limiting example, with reference to the accompanying drawings, in which.

DESCRIPTION OF EMBODIMENTS

Figure 1:
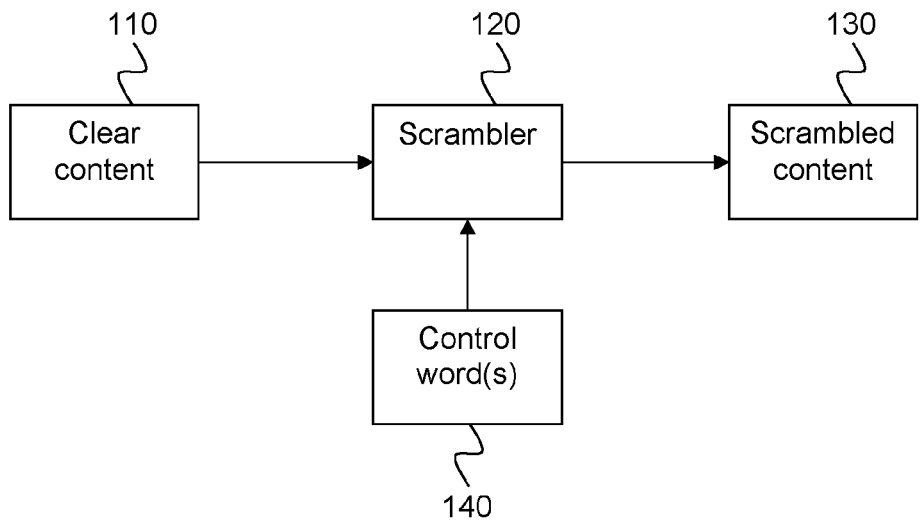
FIG. 1 illustrates a typical prior art example of encryption.

According to a preferred embodiment of the present invention encryption is still performed as generally illustrated in FIG. 1.

Figure 2:
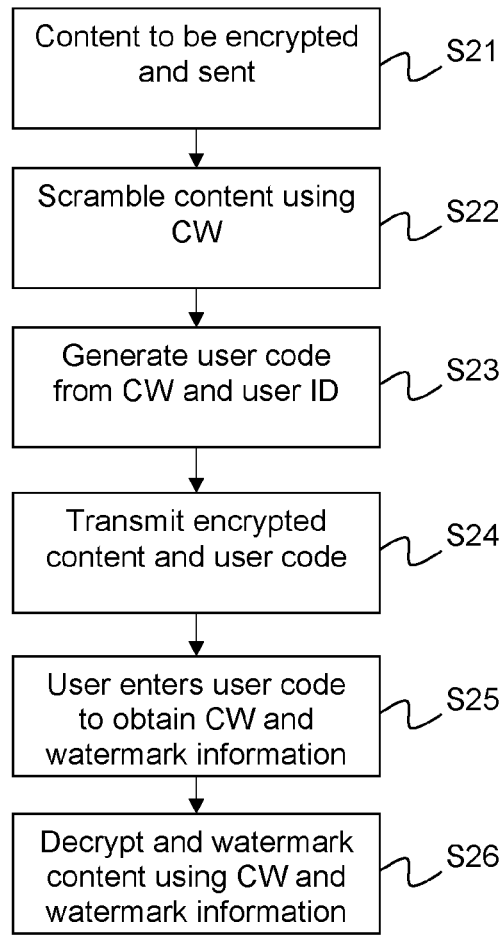
FIG. 2 illustrates a method according to a preferred embodiment of the present invention.

There are however notable differences, as is shown with reference to FIG. 2 that illustrates a method according to a preferred embodiment of the present invention.

First it is decided, S21, to encrypt and send content to a user. This decision may be taken in response to a request from the user or upon the initiative of the entity that detains the content. The content is scrambled, S22, using at least one control word (CW).

Then however, instead of just sending the encrypted content and the password (i.e. in essence the decryption key) to the user, the transmitter generates, S23, a user code by taking an identifier for the user (user ID) and the CW as input to a code generation algorithm (to be further described hereinafter) to obtain the user code. The user code is preferably readable by the user; it is particularly preferred that the user is able to input the user code using a user interface of the device that is used to decrypt (and normally also render) the content. It is however also possible for the user code to be virtually any kind of binary sequence, provided that it is input by the user in some manner at the user's device.

The encrypted content and the user code are then transmitted, S24, to the user, preferably separately, for example by providing the encrypted content on a DVD, Blu-Ray disc or USB device, while the user code is provided in a separate letter, mail, SMS or even by phone.

When the user enters the user code at the user device, this is adapted to take at least the user code as input to a generation algorithm so as to obtain, S25, the CW for decryption of the content and watermark information linked to the user ID. Depending on the implementation, other data could be used as further input to the generation algorithm. For example, for content protected by the Advanced Access Content System (AACS) that is used to protect Blu-ray and HD DVD formats, a so-called Media Key Block may also be input. Other examples comprise a content license and a hardware fingerprint, which provides an identifier for the user device based on identifiers of its hardware components. Naturally, the latter would normally only be used to generate the watermark information.

Then the user device decrypts the content using the CW and inserts a watermark using the watermark information, S26. Naturally, if the user inputs an incorrect user code, then decryption of the content is unsuccessful.

Figure 3:
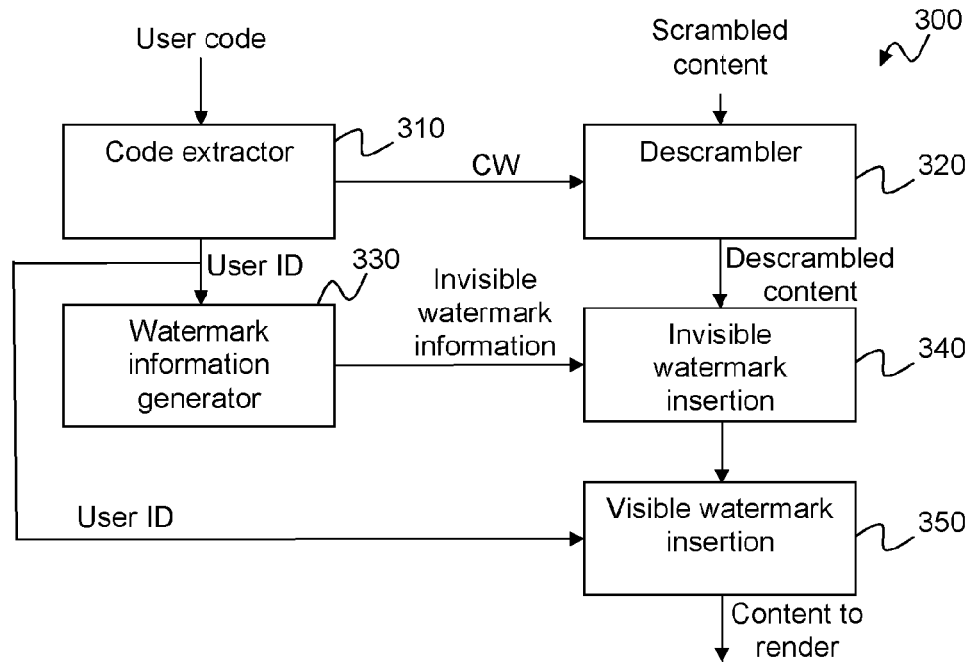
FIG. 3 illustrates rendering of content at a user device according to a preferred embodiment of the present invention.

FIG. 3 illustrates rendering of the content at a user device according to a preferred embodiment of the present invention. A user device 300 receives scrambled content and a user code. The user code is provided by the user as input to a code extractor 310 that possibly uses further information to generate a code word (CW) and a user ID. The code extractor performs the reverse function of the code generation algorithm described with reference to FIG. 2.

The CW is provided to a descrambler 320, which uses this to descramble the scrambled content to generate descrambled content. The user ID is provided to a watermark information generator 330 and a visible watermark insertion unit 350. The watermark information generator 330 takes the user ID and generates invisible watermark information that is inserted into the descrambled content by an invisible watermark insertion unit 340. The output from the invisible watermark insertion unit 340 is provided to the visible watermark insertion unit 350 that inserts the user ID as a visible watermark and outputs content to render.

The watermark information generator preferably generates unique (or probably-unique) watermark information for each user ID. In addition, given the watermark information, it should be possible to retrieve the user ID. Preferably, the algorithm used to generate the watermark information is difficult to guess. Examples of algorithms comprise hashing of the user ID, possibly followed by encryption of the resulting hash, direct encryption of the user ID, and a Hash-based Message Authentication Code (HMAC) with a secret key.

The skilled person will appreciate that while it is preferred to use a visible and an invisible watermark, it is naturally possible to use one or the other. The skilled person will also appreciate that an incorrect password yields an incorrect CW, which means that the descrambler is not able to descramble the content correctly. The invisible watermark insertion unit, as indeed the visible watermark insertion unit, may use any one of the many suitable watermark insertion techniques known in the art.

Figure 4:
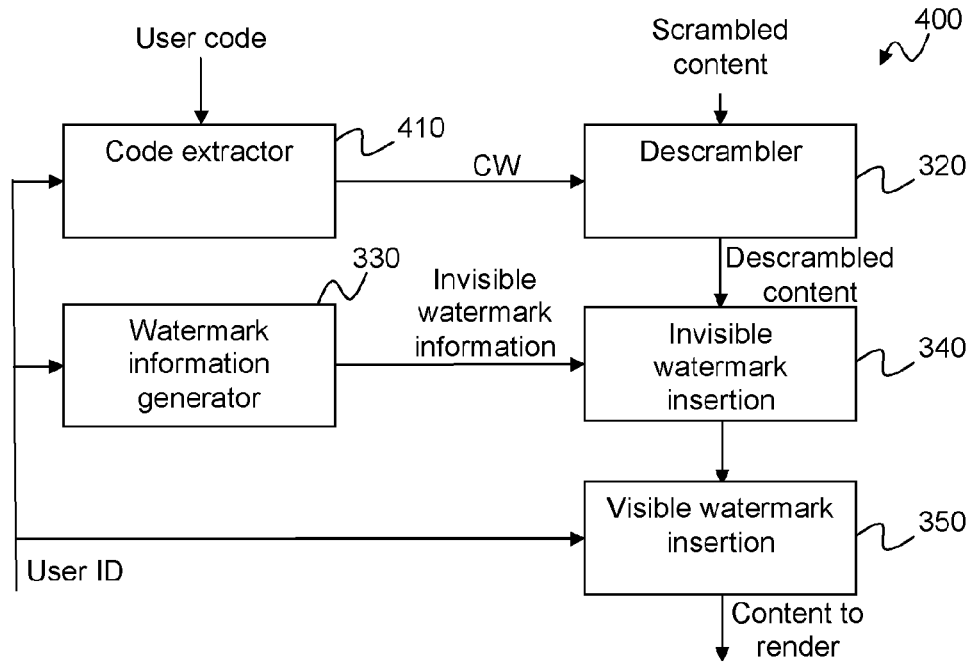
FIG. 4 illustrates a variant embodiment of content rendering of the present invention.

FIG. 4 illustrates a variant embodiment of content rendering at a user device 400. As the variants are relatively close, only the differences will be described. A main difference between the user device 400 of FIG. 4 and the user device 300 of FIG. 3 is that the user inputs the user ID and a personal code. The user code (and possibly other information) is received by a code extractor 410 and the user ID is received by the code extractor 410, a watermark information generator 330 and a visible watermark insertion unit 350. The code extractor 410 uses the user code and the user ID to generate the CW that is provided to the descrambler 320. However, there is no need for the code extractor 410 to provide the user ID as output, since this is already provided by the user.

It will be appreciated that the code extraction algorithm of FIG. 4 is slightly different from that of FIG. 3, since it takes at least two pieces of data as input and generates a single piece of data as output.

Figure 5:
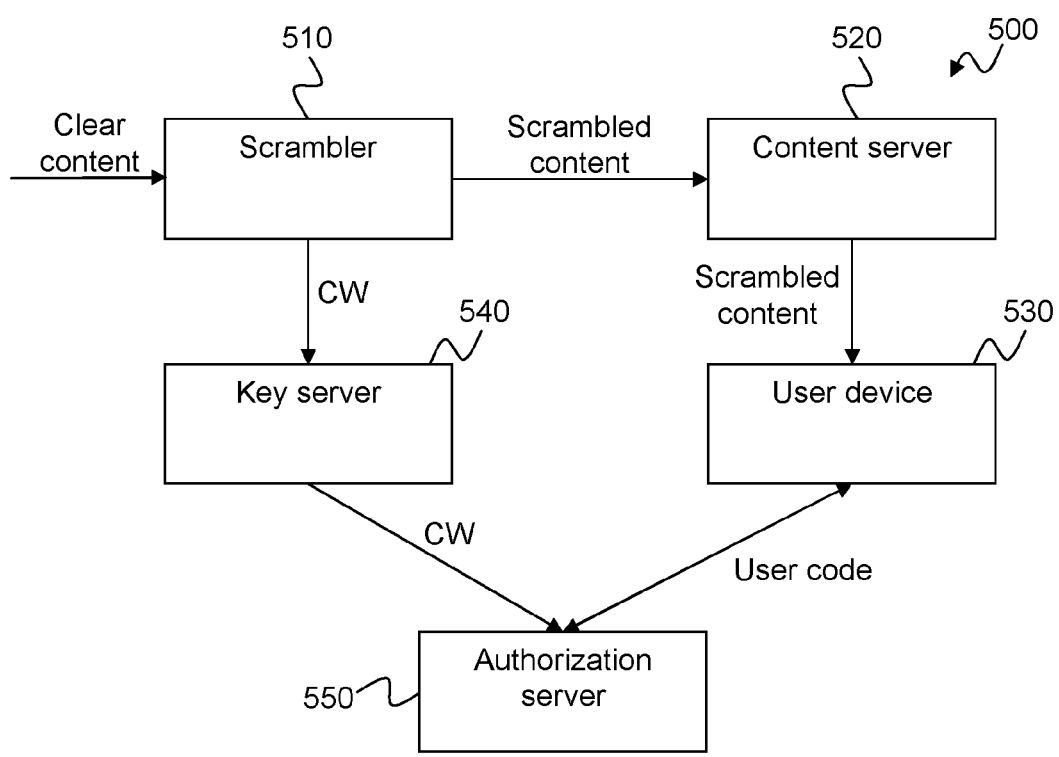
FIG. 5 illustrates a content delivery system 500 according to a preferred embodiment of the present invention.

FIG. 5 illustrates a content delivery system 500 according to a preferred embodiment of the present invention. The system 500 comprises a scrambler 510, a content server 520, a key server 540, an authorization server 550 and a user device 530.

The scrambler 510 takes clear content and scrambles it using a, preferably random, control word (CW) to generate scrambled content. The scrambler preferably implements an AES-128 encryption algorithm. The scrambled content is provided to the content server 520 and the CW is provided to the key server 540; preferably both the scrambled content and the CW are associated with a content identifier to facilitate subsequent retrieval at the content server 520 and the key server 540.

The content server 520 stores scrambled content that may come from a plurality of scramblers. The content server 520 is adapted to deliver scrambled content to the user device. The delivery may be performed using pull or push, or a combination thereof. Instructions to deliver scrambled content may come from the authorization server 550 or the user device 530, but the content server 520 may also take independent decisions to push scrambled content. It is preferred that the content identifier is delivered to the user with the scrambled content.

The key server 540 stores the CWs for the scrambled content. It preferably also implements the code generation algorithm. In the preferred embodiment, it takes at least a user ID received from the authorization server 550 and a CW as input and outputs a user code that is returned to the authorization server 550. Further data, such as for example a Media Key Block or a content license could also be used to generate the user code.

The authorization server 550 receives a request for a specific content (identified by the content identifier), preferably comprising a user ID, from a user, preferably through the user device 530. The authorization server 550 sends the user ID to the key server 540 and receives a user code in return. The user code is then sent to the user device 530. The authorization server may also instruct the content server 520 to provide the scrambled content to the user device 530.

It is preferred that the user authenticates itself with the authorization server 550, for example using login and password, a RSA token or a smartcard. Once authenticated, the user can request the content corresponding to the content identifier and then receive the user code.

The user device 530 preferably implements the user device illustrated in FIG. 3 or FIG. 4. The user device 530 is advantageously implemented on a personal computer, a Smartphone, a tablet computer or the like. The user device 530 preferably has a user interface (such as a keyboard and a screen, which advantageously is the screen used for rendering the content) for the user to input the user code, which advantageously is typed, but other kinds of input, for example drawing, are also possible.

User Code Generation

As already mentioned, the user needs a user code in order to access the scrambled content. For a given pair of user ID and content (i.e. CW), the user code is probably-unique (i.e. the chances of two user codes being identical is negligible) or truly unique. The user code is generated from the user ID and the CW.

A crude, but illustrative example of an algorithm for generation of the user code begins with the generation of a 256-bit intermediate code =AES{K}(User ID||CW||checksum), where:

AES{K} denotes encryption of the information within parenthesis using secret key K.

User ID is limited to 14 bytes and is ASCII coded. A user ID that is shorter than 14 characters is padded with 0x20, i.e. 'SPACE'.

CW is the 128-bit code word.

Checksum is a 16-bit checksum of User ID||CW.

|| stands for concatenation.

The intermediate code is then rendered readable by a human by:

Slicing the 256 bits into a set of 42 successive 6-bit sections followed by a nibble (4 bits).

Each section and the nibble are transformed into a byte by adding 0x21.

Each byte is interpreted as an ASCII-coded character of the user code.

In other words, 0x00 becomes 0x21 (!), 0x01 becomes 0x22 (") and so on until 0x3F that becomes 0x60 ('). Note that it may be necessary to 'replace' certain ASCII characters that may be difficult to input, such as ^ and _ by simpler characters such as the character 'a'.

The user code thus is a 43-byte string of ASCII characters ranging from ! to a.

An example intends to make this clearer. Assume that the four first bytes of the intermediate code are 00101010001000110010100111000010. Sliced into 6-bit sections, this gives 001010 100010 001100 101001 110000 10 . . . or, in hex, 0x0A 0x22 0x0C 0x29 0x30 . . . . Adding 0x21 to this gives 0x2B 0x43 0x2D 0x4A 0x51 . . . . Translated into ASCII characters, this gives +C–J Q . . . . The user code to be input by the user is thus +C–JQ . . . .

To decrypt the content, the user device receives the 43-byte user code input by the user. In the preferred embodiment, the code extractor 310 'mirrors' the user code generation algorithm:

0x21 is subtracted from each of the 43 bytes; the first 42 bytes are then transformed into 6-bit numbers and the last byte is transformed into a nibble.

The 42 6-bit numbers and the nibble are concatenated into a 256-bit number.

The 256-bit number is decrypted using the secret key K.

The user ID, the CW and the checksum are extracted.

If the checksum successfully verified, the CW is delivered to the descrambler and the user ID to the watermark information generator and the visible watermark insertion unit.

It will be appreciated that the present invention can provide a unique password for each user and that the system can enable user unique watermarking (visible and invisible) of distributed content. The information in the watermark can depend solely from a text string input by the user; the watermarking can thus be independent of the user device, while it at the same time is linked to the user. It can then be possible to track a user who has divulged the user code to other, unauthorized, user who in turn have accessed and distributed the content.

It will also be appreciated that the present invention provides a solution that is simpler than the solution in US 2006/156003, since a single text string can be used to generate both control word and watermark information, whereas the US document receives a license that is decrypted to obtain A possible field of use is for so-called screeners for films that may be distributed to reviewers and to film festival jury members. The unique watermarking allows discovery of the source of any leaked content.

Each feature disclosed in the description and (where appropriate) the claims and drawings may be provided independently or in any appropriate combination. Reference numerals appearing in the claims are by way of illustration only and shall have no limiting effect on the scope of the claims.

The invention claimed is:

1. A method of processing digital content, the method comprising:

receiving, by at least one processor, content scrambled using a control word;

receiving, via a user interface, a user code, wherein a user identifier and the control word are concatenated and encrypted in the user code based on a secret key;

decrypting, by the at least one processor, the control word and the user identifier from the user code using the secret key;

descrambling, by the at least one processor, the scrambled content using the control word;

generating, by the at least one processor, a watermark based on the user identifier such that the watermark is uniquely associated with the user identifier;

inserting, by the at least one processor, the watermark into the descrambled content; and outputting, by the at least one processor, the watermarked content, wherein the decrypting comprises:

obtaining, by the at least one processor, an intermediate code from the user code; and decrypting, by the at least one processor, the control word and the user identifier from the intermediate code.

2. The method of claim 1, wherein the watermark is an invisible watermark.

3. The method of claim 1, further comprising inserting, by the at least one processor, the user identifier as a visible watermark.

4. A device for processing digital content, the device comprising a processor configured to:

receive content scrambled using a control word;

receive, via a user interface, a user code, wherein a user identifier and the control word are concatenated and encrypted in the user code based on a secret key;

decrypt the user identifier and the control word from the user code using the secret key;

descramble the scrambled content using the control word;

generate a watermark based on the user identifier such that the watermark is uniquely associated with the user identifier;

insert the watermark into the descrambled content; and output the watermarked content, wherein the decrypt comprises the processor configured to:

obtain an intermediate code from the user code; and decrypt the control word and the user identifier from the intermediate code.

5. The device of claim 4, wherein the watermark is an invisible watermark.

6. The device of claim 4, wherein the processor is further configured to insert the user identifier as a visible watermark.

7. The method of claim 1, wherein the user code is a text string.

8. The device of claim 4, wherein the user code is a text string.

* * * * *